US009817995B2

(12) United States Patent
Papakipos et al.

(10) Patent No.: US 9,817,995 B2
(45) Date of Patent: *Nov. 14, 2017

(54) PROTECTING PERSONAL INFORMATION UPON SHARING A PERSONAL COMPUTING DEVICE

(71) Applicant: Facebook, Inc., Menlo Park, CA (US)

(72) Inventors: Matthew Nicholas Papakipos, Portola Valley, CA (US); Cory Rudolph Ondrejka, Los Gatos, CA (US); Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,832

(22) Filed: Feb. 24, 2015

(65) Prior Publication Data

US 2015/0169900 A1    Jun. 18, 2015

Related U.S. Application Data

(63) Continuation of application No. 13/308,743, filed on Dec. 1, 2011, now Pat. No. 8,997,213.

(51) Int. Cl.
*G06F 7/04* (2006.01)
*G06F 21/62* (2013.01)
*G06F 21/31* (2013.01)

(52) U.S. Cl.
CPC .......... *G06F 21/6245* (2013.01); *G06F 21/31* (2013.01)

(58) Field of Classification Search
CPC ............................ G06F 21/31; G06F 21/6245

USPC .............................. 726/5–7, 17–19; 713/182
See application file for complete search history.

(56) References Cited

U.S. PATENT DOCUMENTS

| | | | | |
|---|---|---|---|---|
| 7,634,565 B2 * | 12/2009 | Goffin | ..................... | H04L 12/66 709/225 |
| 2002/0045457 A1 * | 4/2002 | Taniguchi | ........... | H04M 1/2745 455/463 |
| 2005/0289226 A1 * | 12/2005 | Mohammed | ............ | G06F 21/33 709/208 |
| 2008/0255993 A1 * | 10/2008 | Blinbaum | .............. | G06Q 20/40 705/44 |
| 2009/0282473 A1 * | 11/2009 | Karlson | ................ | H04L 63/102 726/17 |
| 2010/0144315 A1 * | 6/2010 | Jayasuriya | .............. | H04M 1/57 455/411 |

(Continued)

*Primary Examiner* — Samson Lemma
(74) *Attorney, Agent, or Firm* — Baker Botts L.L.P.

(57) ABSTRACT

In particular embodiments, a temporary user is able to use another's personal computing device in shared mode for a short period of time while experiencing a personalized user interface. An indication is detected that a personal computing device associated with a primary user is to be shared with a temporary user. Access to local personal information associated with the primary user is disabled if it is stored on the personal computing device. Access to remote personal information of the primary user that is accessible from the personal computing device is disabled. A personalized user interface incorporating personal information associated with the temporary user is presented on the personal computing device for the temporary user. Personal information of the primary user is not accessible by the temporary user, and vice versa. When shared mode is to be terminated, all personal information of the temporary user is deleted.

17 Claims, 7 Drawing Sheets

(56) References Cited

U.S. PATENT DOCUMENTS

2012/0272301 A1\* 10/2012 LoBean ............... H04L 9/3228
 726/6
2013/0017526 A1\* 1/2013 Nguyen ................ G09B 7/02
 434/362

\* cited by examiner

PROTECTING PERSONAL INFORMATION UPON SHARING A PERSONAL COMPUTING DEVICE

PRIORITY

This application is a continuation under 35 U.S.C. §120 of U.S. patent application Ser. No. 13/308,743, filed 1 Dec. 2011.

BACKGROUND

Mobile computing and communication devices, such as cellphones, PDAs, tablet computers, and mini-laptops have become prevalent in recent years. Such mobile devices are often tied to a specific individual and therefore contain personal information, including account information, user profile information, and pre-authorized and pre-authenticated access to Internet-connected applications with further access to personal, private, and confidential information. This may present a problem when a device owner or primary user of the device would like to temporarily allow another person to access or "try out" the device and associated functions—ideally, the other person would be able to try out the device and its functionality without having access to the primary user's personal information. In addition, while the other person is trying out the phone, they may enter their own personal information, to which they may not want to allow the primary user access.

INTRODUCTION

The present disclosure relates generally to personal computing and communication devices associated with private information, and, more specifically, relates to shielding of private information on such a personal computing device in connection with temporary usage of the personal device.

The figures depict various embodiments of the present disclosure for purposes of illustration only. One skilled in the art will readily recognize from the following discussion that alternative embodiments of the structures and methods illustrated herein may be employed without departing from the principles of the invention described herein.

DESCRIPTION OF EXAMPLE EMBODIMENT(S)

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Overview

Particular embodiments relate to a social networking environment including a social networking system and related systems that include conventional stationary as well as mobile embodiments. A social networking system offers its users the ability to communicate and interact with other users of the social networking system. Users join the social networking system and then add connections to a number of other users to whom they desire to be connected. Once they are members of the social network, the users may interact with the social network itself, by viewing and posting images and video on their own page, or by using personal computing devices to view and post location-based social networking information.

In particular embodiments, a user may want to share their personal computing device with another user. Such an occasion may occur informally (e.g., a friend who lets a friend try out their device) or formally (e.g., trying out a device in a retail store). When the personal computing device utilizes software, e.g., an operating system and/or applications, that relies upon personal information (including not only confidential information, but also any user-specific, user-entered, or user-generated information) to provide a personalized experience, the personal computing device may need to shield such personal information belonging to one user from being viewed or accessed by another user. This may include not only the situation where personal information is stored on the device itself, but also situations where certain applications and/or the operating system have access to personal information stored remotely (e.g., email and communication applications, such as Gmail™ or Twitter™, social-networking applications, such as Facebook™ or LinkedIn®, online banking and e-commerce applications, or content-sharing applications, such as YouTube™ or Picasa™).

In particular embodiments, a primary user of a personal computing device can protect their personal information by indicating that they are about to share their device with a temporary user (e.g., by clicking a button or selecting a menu option). In particular embodiments, the personal computing device may be able to detect that the primary user is holding or viewing the device by using biometric identification technology; in such embodiments, the device may also be able to detect when the primary user has let go of the device, or is no longer viewing the device, or when another user is holding or viewing the device.

In particular embodiments, when the primary user indicates, either passively or actively, that they are about to share the device with a temporary user or have just handed the device to a temporary user, the device may take one or more actions to protect personal information: (1) the device may remove or disable access to content, applications, information, or other data for which a user must be authenticated and/or authorized (e.g., by logging out of a website, or by deleting cookies, or by disabling access to security certificates), (2) the device may remove or disable personal information stored on the device itself, and (3) the device may clear out any caches, logs, and/or other sources of information that may track actions taken by or events that occurred with respect to the primary user.

In particular embodiments, the device enables the primary user to send an invitation with or without a secure authorization code to a potential temporary user, who is then able to log in to the device using information in the invitation. In particular embodiments, once the invitation has been sent, the device pre-loads information associated with the potential temporary user, so as to provide a personalized experience once the potential temporary user logs in to the device.

In particular embodiments, the device enables sharing with an anonymous temporary guest user. In particular embodiments, the device can be configured as a public device intended for use by multiple temporary users. In particular embodiments, for anonymous guest users and/or for public use, the device displays a generic set of applications and content to allow such temporary users to "try out" features and functionality of the device.

Figure 1:
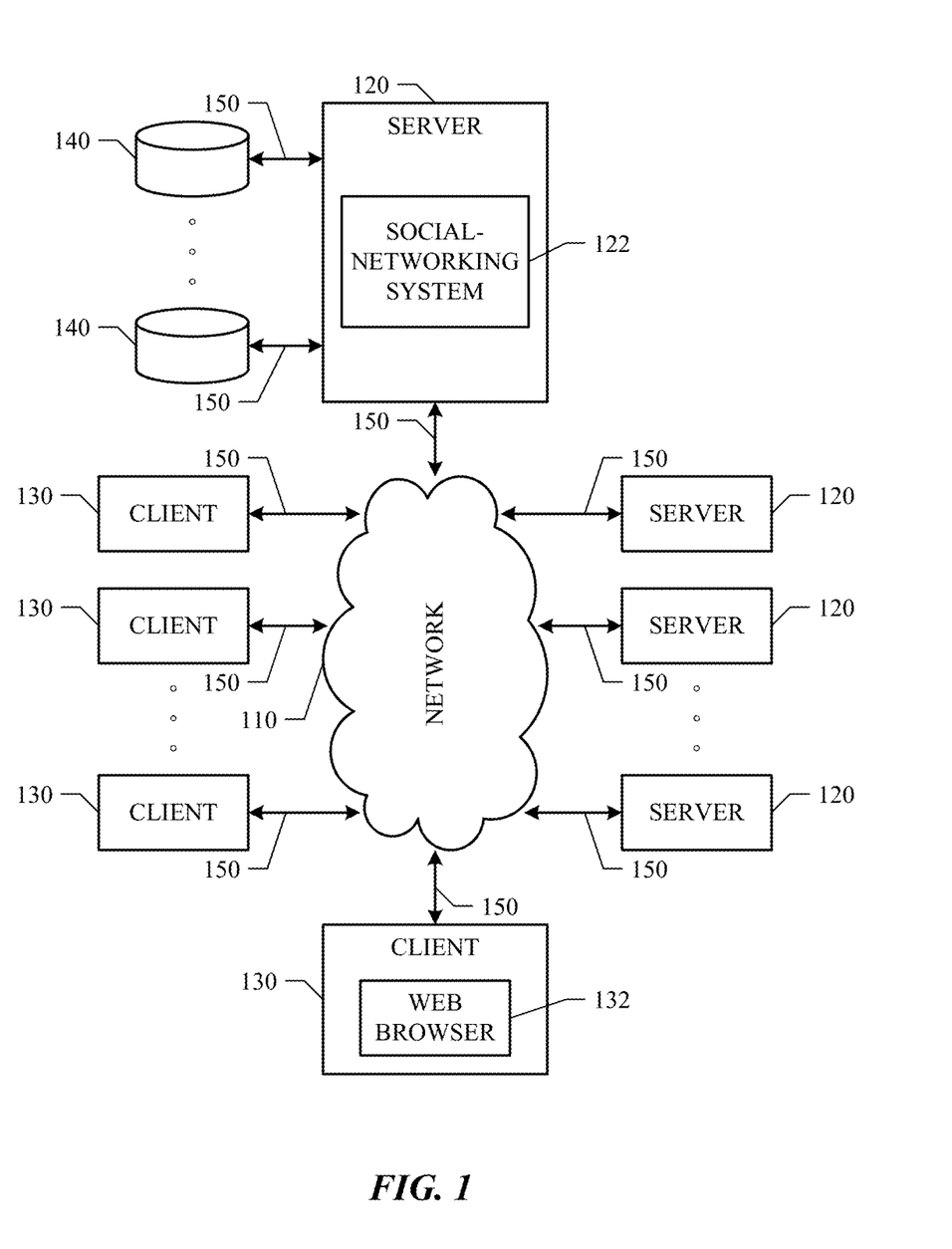
FIG. 1 illustrates an example network architecture associated with a social network.

FIG. 1 illustrates an example network environment 100. Network environment 100 includes a network 110 coupling one or more servers 120 and one or more clients 130 to each other. In particular embodiments, network 110 is an intranet, an extranet, a virtual private network (VPN), a local area network (LAN), a wireless LAN (WLAN), a wide area network (WAN), a metropolitan area network (MAN), a portion of the Internet, a cellular technology-based network, a satellite communications technology-based network, or another network 110 or a combination of two or more such networks 110. This disclosure contemplates any suitable network 110.

One or more links 150 couple a server 120 or a client 130 to network 110. In particular embodiments, one or more links 150 each includes one or more wireline, wireless, or optical links 150. In particular embodiments, one or more links 150 each includes an intranet, an extranet, a VPN, a LAN, a WLAN, a WAN, a MAN, a portion of the Internet, a cellular technology-based network, a satellite communications technology-based network, or another link 150 or a combination of two or more such links 150. This disclosure contemplates any suitable links 150 coupling servers 120 and clients 130 to network 110.

In particular embodiments, each server 120 may be a unitary server or a distributed server spanning multiple computers or multiple datacenters. Servers 120 may be of various types, such as, for example and without limitation, web server, news server, mail server, message server, advertising server, file server, application server, exchange server, database server, proxy server, another server suitable for performing functions and/or processes described herein, or any combination thereof. In particular embodiments, each server 120 may include hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host HTML files or other file types, or may dynamically create or constitute files upon a request, and communicate them to clients 130 in response to HTTP or other requests from clients 130. A mail server is generally capable of providing electronic mail services to various clients 130. A database server is generally capable of providing an interface for managing data stored in one or more data stores. In particular embodiments, a social-networking system 122 may be hosted on a server 120.

In particular embodiments, one or more data storages 140 may be communicatively linked to one or more severs 120 via one or more links 150. In particular embodiments, data storages 140 may be used to store various types of information. In particular embodiments, the information stored in data storages 140 may be organized according to specific data structures. In particular embodiments, each data storage 140 may be a relational database. Particular embodiments may provide interfaces that enable servers 120 or clients 130 to manage, e.g., retrieve, modify, add, or delete, the information stored in data storage 140.

In particular embodiments, each client 130 may be an electronic device including hardware, software, or embedded logic components or a combination of two or more such components and capable of carrying out the appropriate functionalities implemented or supported by client 130. For example and without limitation, a client 130 may comprise a computer system such as: a desktop computer, a notebook or laptop, a netbook, a tablet, an e-book reader, a GPS device, a camera, a personal digital assistant (PDA), a handheld electronic device, a mobile telephone, or another similar processor-based electronic device. This disclosure contemplates any suitable clients 130. A client 130 may enable a network user at client 130 to access network 130. A client 130 may enable its user to communicate with other users at other clients 130. In particular embodiments, a client device 130 may comprise a personal computing device 200 as described in FIGS. 2A and 2B.

A client 130 may have a web browser 132, such as MICROSOFT® INTERNET EXPLORER®, GOOGLE CHROME™ or MOZILLA FIREFOX®, and may have one or more add-ons, plug-ins, or other extensions, such as TOOLBAR or YAHOO TOOLBAR®. A user at client 130 may enter a Uniform Resource Locator (URL) or other address directing the web browser 132 to a server 120, and the web browser 132 may generate a Hyper Text Transfer Protocol (HTTP) request and communicate the HTTP request to server 120. Server 120 may accept the HTTP request and communicate to client 130 one or more Hyper Text Markup Language (HTML) files responsive to the HTTP request. Client 130 may render a web page based on the HTML files from server 120 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT®, JAVA®, MICROSOFT® SILVERLIGHT®, combinations of markup language and scripts such as AJAX (Asynchronous JAVASCRIPT® and XML), and the like. Herein, reference to a web page encompasses one or more corresponding web page files (which a browser may use to render the web page) and vice versa, where appropriate.

Figure 2A:
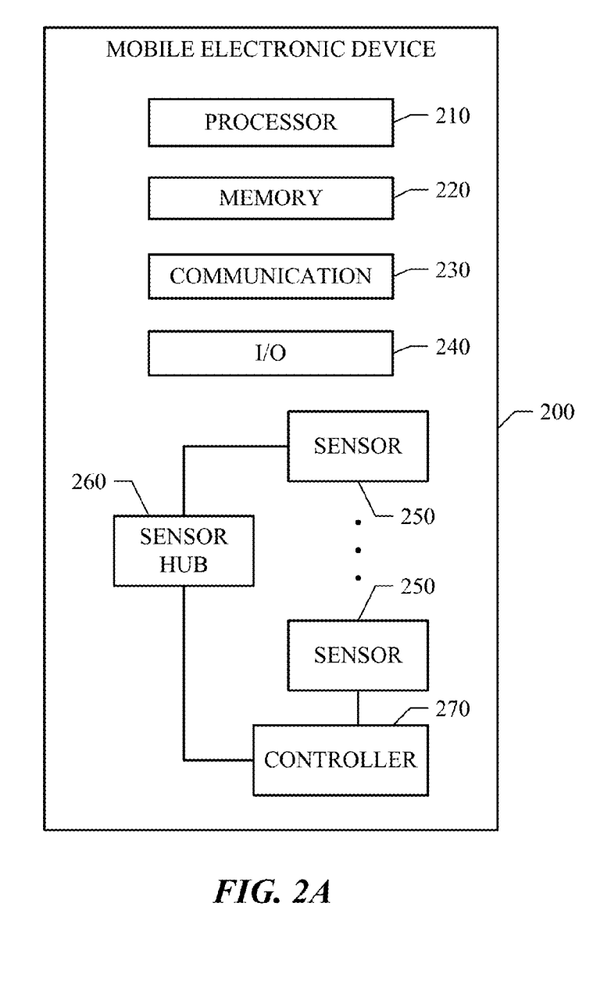
FIGS. 2A-B illustrate an example personal computing device.

FIG. 2A illustrates an example personal computing device 200. In particular embodiments, personal computing device 200 may comprise a processor 210, a memory 220, a communication component 230 (e.g., antenna and communication interface for wireless communications), one or more input and/or output (I/O) components and/or interfaces 240, and one or more sensors 250. In particular embodiments, one or more I/O components and/or interfaces 240 may incorporate one or more sensors 250. In particular embodiments, personal computing device 200 may comprise a computer system or and element thereof as described in FIG. 7 and associated description.

In particular embodiments, a personal computing device, such as a mobile device, may include various types of sensors 250, such as, for example and without limitation: touch sensors (disposed, for example, on a display of the device, the back of the device and/or one or more lateral edges of the device) for detecting a user touching the surface of the mobile electronic device (e.g., using one or more fingers); accelerometer for detecting whether the personal computing device 200 is moving and the speed of the movement; thermometer for measuring the temperature change near the personal computing device 200; proximity sensor for detecting the proximity of the personal computing device 200 to another object (e.g., a hand, desk, or other object); light sensor for measuring the ambient light around the personal computing device 200; imaging sensor (e.g., camera) for capturing digital still images and/or video of objects near the personal computing device 200 (e.g., scenes, people, bar codes, QR codes, etc.); location sensors (e.g., Global Positioning System (GPS)) for determining the location (e.g., in terms of latitude and longitude) of the mobile electronic device; sensors for detecting communication networks within close proximity (e.g., near field communication (NFC), Bluetooth, RFID, infrared); chemical sensors; biometric sensors for biometrics-based (e.g., fingerprint, palm vein pattern, hand geometry, iris/retina, DNA, face, voice, olfactory, sweat) authentication of user of personal computing device 200; etc. This disclosure contemplates that a mobile electronic device may include any applicable type of sensor. Sensors may provide various types of sensor data, which may be analyzed to determine the user's intention with respect to the mobile electronic device at a given time.

In particular embodiments, a sensors hub 260 may optionally be included in personal computing device 200. Sensors 250 may be connected to sensors hub 260, which may be a low power-consuming processor that controls sensors 250, manages power for sensors 250, processes sensor inputs, aggregates sensor data, and performs certain sensor functions. In addition, in particular embodiments, some types of sensors 250 may be connected to a controller 270. In this case, sensors hub 260 may be connected to controller 270, which in turn is connected to sensor 250. Alternatively, in particular embodiments, there may be a sensor monitor in place of sensors hub 260 for managing sensors 250.

In particular embodiments, in addition to the front side, personal computing device 200 may have one or more sensors for performing biometric identification. Such sensors may be positioned on any surface of personal computing device 200. In example embodiments, as the user's hand touches personal computing device 200 to grab hold of it, the touch sensors may capture the user's fingerprints or palm vein pattern. In example embodiments, while a user is viewing the screen of personal computing device 200, a camera may capture an image of the user's face to perform facial recognition. In example embodiments, while a user is viewing the screen of personal computing device 200, an infrared scanner may scan the user's iris and/or retina. In example embodiments, while a user is in contact or close proximity with personal computing device 200, chemical and/or olfactory sensors may capture relevant data about a user. In particular embodiments, upon detecting that there is a change in state with respect to the identity of the user utilizing personal computing device 200, either by itself or in combination with other types of sensor indications, personal computing device 200 may determine that it is being shared.

In particular embodiments, in addition to the front side, the personal computing device 200 may have touch sensors on the left and right sides. Optionally, the personal computing device 200 may also have touch sensors on the back, top, or bottom side. Thus, as the user's hand touches personal computing device 200 to grab hold of it, the touch sensors may detect the user's fingers or palm touching personal computing device 200. In particular embodiments, upon detecting that there is a change in state with respect to a user touching personal computing device 200, either by itself or in combination with other types of sensor indications, personal computing device 200 may determine that it is being shared.

In particular embodiments, personal computing device 200 may have an accelerometer in addition to or instead of the touch sensors on the left and right sides. Sensor data provided by the accelerometer may also be used to estimate whether a new user has picked up personal computing device 200 from a resting position, e.g., on a table or desk, display shelf, or from someone's hand or from within someone's bag. When the user picks up personal computing device 200 and brings it in front of the user's face, there may be a relatively sudden increase in the movement speed of personal computing device 200. This change in the device's movement speed may be detected based on the sensor data supplied by the accelerometer. In particular embodiments, upon detecting that there is a significant increase in the speed of the device's movement, either by itself or in combination with other types of sensor indications, personal computing device 200 may determine that it is being shared.

In particular embodiments, personal computing device 200 may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of personal computing device 200. When personal computing device 200 is stored on a shelf or in the user's bag, it may stay mostly in one orientation. However, when the user grabs hold of personal computing device 200 and lifts it up and/or moves it closer to bring it in front of the user's face, there may be a relatively sudden change in the orientation of personal computing device 200. The orientation of personal computing device 200 may be detected and measured by the gyrometer. If the orientation of personal computing device 200 has changed significantly. In particular embodiments, upon detecting that there is a significant change in the orientation of personal computing device 200, either by itself or in combination with other types of sensor indications, personal computing device 200 may determine that it is being shared.

In particular embodiments, personal computing device 200 may have a light sensor. When personal computing device 200 is stored in a user's pocket or case, it is relatively dark around personal computing device 200. On the other hand, when the user brings personal computing device 200 out of his pocket, it may be relatively bright around personal computing device 200, especially during day time or in well-lit areas. The sensor data supplied by the light sensor may be analyzed to detect when a significant change in the ambient light level around personal computing device 200 occurs. In particular embodiments, upon detecting that there is a significant increase in the ambient light level around personal computing device 200, either by itself or in combination with other types of sensor indications, personal computing device 200 may determine that it is being shared.

Figure 2B:
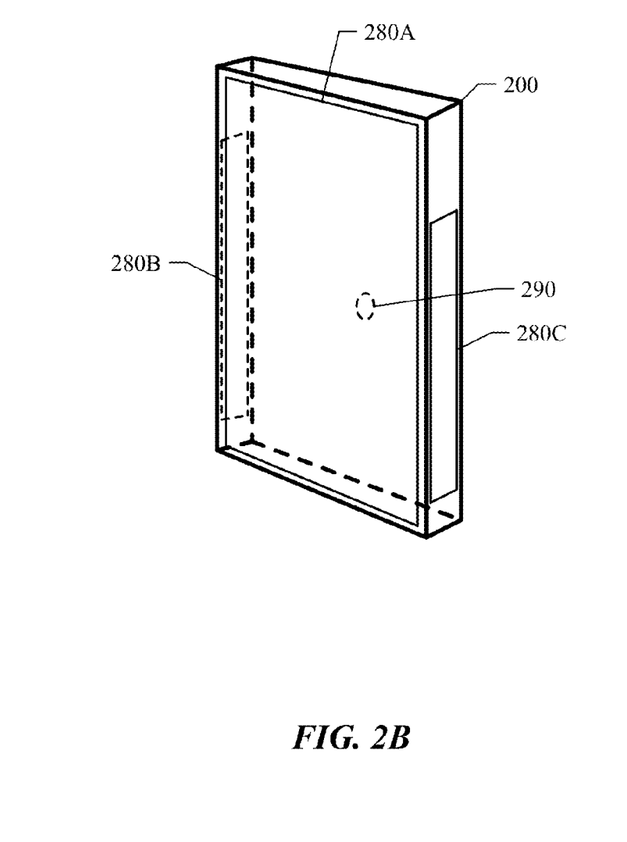

In particular embodiments, personal computing device 200 may have a proximity sensor. The sensor data supplied by the proximity sensor may be analyzed to detect when personal computing device 200 is in close proximity to a specific object, such as the user's hand. For example, mobile device 200 may have an infrared LED (light-emitting diode) 290 (i.e., proximity sensor) placed on its back side. When the user holds such a mobile device in his hand, the palm of the user's hand may cover infrared LED 290. As a result, infrared LED 290 may detect when the user's hand is in close proximity to mobile device 200. In particular embodiments, upon detecting that personal computing device 200 is in close proximity to the user's hand, either by itself or in combination with other types of sensor indications, personal computing device 200 may determine that it is being shared.

A personal computing device 200 may have any number of sensors of various types, and these sensors may supply different types of sensor data. Different combinations of the individual types of sensor data may be used together to detect and estimate a user's current intention with respect to personal computing device 200 (e.g., whether the user really means to take personal computing device 200 out of his pocket and use it). Sometimes, using multiple types of sensor data in combination may yield a more accurate, and thus better, estimation of the user's intention with respect to personal computing device 200 at a given time than only using a single type of sensor data. Nevertheless, it is possible to estimate the user's intention using a single type of sensor data (e.g., touch-sensor data).

FIG. 2B illustrates the exterior of an example personal computing device 200. Personal computing device 200 has approximately six sides: front, back, top, bottom, left, and right. Touch sensors may be placed anywhere on any of the six sides of personal computing device 200. For example, in FIG. 2, a touchscreen incorporating touch sensors 280A is placed on the front of personal computing device 200. The touchscreen may function as an input/output (I/O) component for personal computing device 200. In addition, touch sensors 280B and 280C are placed on the left and right sides of personal computing device 200, respectively. Touch sensors 280B and 280C may detect a user's hand touching the sides of personal computing device 200. In particular embodiments, touch sensors 280A, 280B, 280C may be implemented using resistive, capacitive, and/or inductive touch sensors. The electrodes of the touch sensors 280A, 280B, 280C may be arranged on a thin solid piece of material or a thin wire mesh. In the case of capacitive touch sensors, there may be two types of electrodes: transmitting and receiving. These electrodes may be connected to a controller (e.g., controller 270 illustrated in FIG. 2), which may be a microchip designed to drive the transmitting electrodes with electrical pulses and measure the changes in capacitance from the receiving electrodes caused by a user's touches in order to detect the locations of the user touches.

Of course, personal computing device 200 is merely an example. In practice, a device may have any number of sides, and this disclosure contemplates devices with any number of sides. The touch sensors may be placed on any side of a device.

In particular embodiments, personal computing device 200 may have a proximity sensor 290 (e.g., an infrared LED) placed on its back side. Proximity sensor 290 may be able to supply sensor data for determining its proximity, and thus the proximity of personal computing device 200, to another object.

Figure 3:
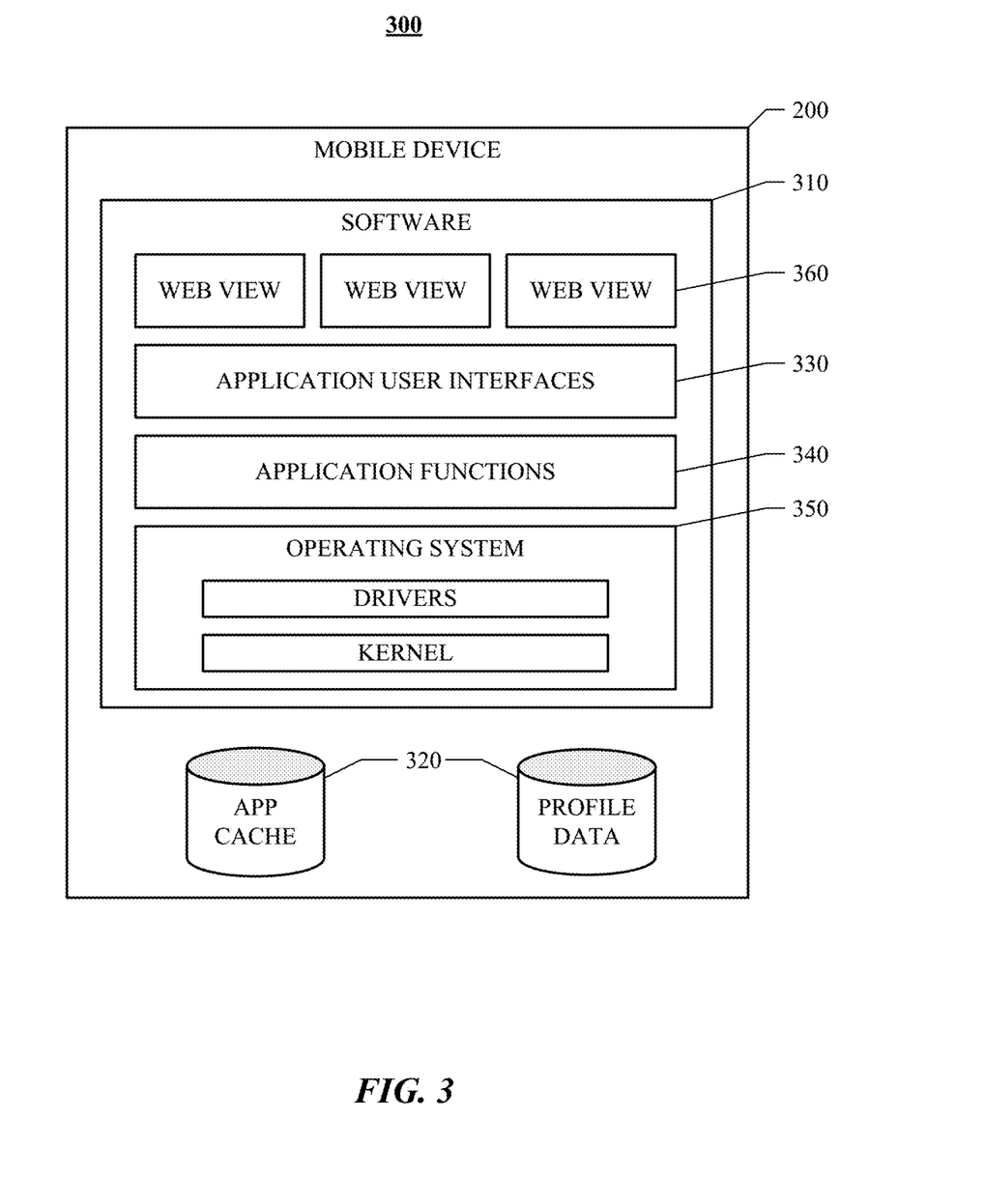
FIG. 3 illustrates an example software architecture for information and applications on a personal computing device.

FIG. 3 illustrates an example software architecture 300 for information and applications on a personal computing device 200. In particular embodiments, software architecture 300 may comprise software 310 and data store(s) 320. In particular embodiments, personal information may be stored in an application data cache 320 and/or a profile data store 320 and/or another data store 320. In particular embodiments, one or more software applications may be executed on personal computing device 200. In particular embodiments, they may be web-based applications hosted on servers. For example, a web-based application may be associated with a URI (Uniform Resource Identifier) or URL (Uniform Resource Locator). From personal computing device 200, a user may access the web-based application through its associated URI or URL (e.g., by using a web browser). Alternatively, in other embodiments, they may be native applications installed and residing on personal computing device 200. Thus, software 310 may also include any number of application user interfaces 330 and application functions 340. For example, one application (e.g., Google Maps) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using personal computing device 200; a fifth application may allow the device user to receive and initiate VoIP and/or cellular network calls, and so on. Each application has one or more specific functionalities, and the software (e.g., one or more software modules) implementing these functionalities may be included in application functions 340. Each application may also have a user interface that enables the device user to interact with the application, and the software implementing the application user interface may be included in application user interfaces 330. In particular embodiments, the functionalities of an application may be implemented using JavaScript®, Java®, C, or other suitable programming languages. In particular embodiments, the user interface of an application may be implemented using HyperText Markup Language (HTML), JavaScript®, Java®, or other suitable programming languages.

In particular embodiments, the user interface of an application may include any number of screens or displays. In particular embodiments, each screen or display of the user interface may be implemented as a web page. Thus, the device user may interact with the application through a series of screens or displays (i.e., a series of web pages). In particular embodiments, operating system 350 is Google's Android™ mobile technology platform. With Android®, there is a Java® package called "android.webkit", which provides various tools for browsing the web. Among the "android.webkit" package, there is a Java class called "android.webkit.WebView", which implements a View for displaying web pages. This class uses the WebKit rendering engine to display web pages and includes methods to navigate forward and backward through a history, zoom in, zoom out, perform text searches, and so on. In particular embodiments, an application user interface 330 may utilize Android's WebView application programming interface (API) to display each web page of the user interface in a View implemented by the "android.webkit.WebView" class. Thus, in particular embodiments, software 310 may include any number of web views 360, each for displaying one or more web pages that implement the user interface of an application.

During the execution of an application, the device user may interact with the application through its user interface. For example, the user may provide inputs to the application in various displays (e.g., web pages). Outputs of the application may be presented to the user in various displays (e.g., web pages) as well. In particular embodiments, when the user provides an input to the application through a specific display (e.g., a specific web page), an event (e.g., an input event) may be generated by, for example, a web view 360 or application user interfaces 330. Each input event may be forwarded to application functions 340, or application functions 340 may listen for input events thus generated. When application functions 340 receive an input event, the appropriate software module in application functions 340 may be invoked to process the event. In addition, specific functionalities provided by operating system 350 and/or hardware (e.g., as described in FIGS. 1 and 2A-B) may also be invoked. For example, if the event is generated as a result of the user pushing a button to take a photo with personal computing device 200, a corresponding image processing module may be invoked to convert the raw image data into an image file (e.g., JPG or GIF) and store the image file in the storage 320 of personal computing device 200. As anther example, if the event is generated as a result of the user selecting an icon to compose an instant message, the corresponding short message service (SMS) module may be invoked to enable the user to compose and send the message.

In particular embodiments, when an output of the application is ready to be presented to the user, an event (e.g., an output event) may be generated by, for example, a software module in application functions 340 or operating system 350. Each output event may be forwarded to application user interfaces 330, or application user interfaces 330 may listen for output events thus generated. When application user interfaces 330 receive an output event, it may construct a web view 360 to display a web page representing or containing the output. For example, in response to the user selecting an icon to compose an instant message, an output may be constructed that includes a text field that allows the user to input the message. This output may be presented to the user as a web page and displayed to the user in a web view 360 so that the user may type into the text field the message to be sent.

The user interface of an application may be implemented using a suitable programming language (e.g., HTML, JavaScript®, or Java®). More specifically, in particular embodiments, each web page that implements a screen or display of the user interface may be implemented using a suitable programming language. In particular embodiments, when a web view 360 is constructed to display a web page (e.g., by application user interfaces 330 in response to an output event), the code implementing the web page is loaded into web view 360.

Figure 4:
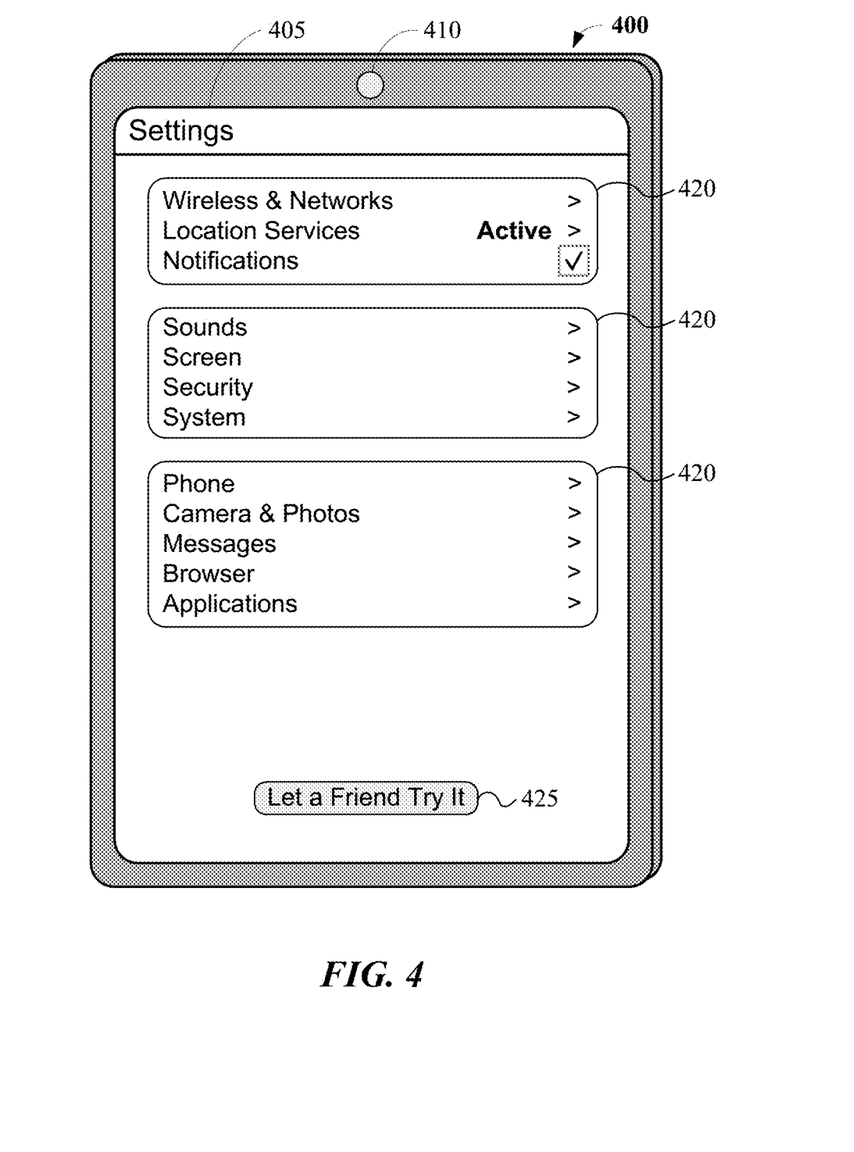
FIG. 4 illustrates an example wireframe in which a primary user temporarily allows another user to use his personal computing device.

FIG. 4 illustrates an example scenario in which a primary user allows a temporary user to use his personal computing device. FIG. 4 illustrates an example personal computing device 400, which comprises a personal computing device as described above. In particular embodiments, personal computing device 400 includes a touch screen 405 and a sensor 410.

In particular embodiments, the primary user may be able to navigate through menus in the user interface (e.g., in the Device Settings menu) to activate shared mode. The user interface displayed on touch screen 405 shows one or more menu options 430 for device settings. To share the personal computing device, the primary user can click button 440 ("Let a Friend Try It"), which links to an interface for authentication/authorization (see FIG. 5A) where the temporary user can log in.

In particular embodiments, the primary user may be able to pull up the option to activate shared mode by pulling down a special menu bar (e.g., the Facebook Uberbar), or by making a particular gesture, or by speaking a particular voice command, or by activating a physical button or switch, or in another conventional manner of transmitting input to a personal computing device.

In particular embodiments, a temporary user may wish to log in to a generic personal computing device 400 (e.g., a demo model at a retail store). In particular embodiments, the demo model has a default mode of playing a looped video demonstrating features and functionality of the device; in particular embodiments, a temporary user in the retail store can pick up the generic personal computing device, tap on the screen (or input another appropriate indication), and open up an interface for authentication/authorization (see FIG. 5A) where the temporary user can log in. In particular embodiments, a default demo user account has been used to log in to the generic personal computing device 400 prior to being made available at a retail store as a demo model. In particular embodiments, an obfuscated gesture or code may be used to easily reset the generic personal computing device 400.

Figure 5A:
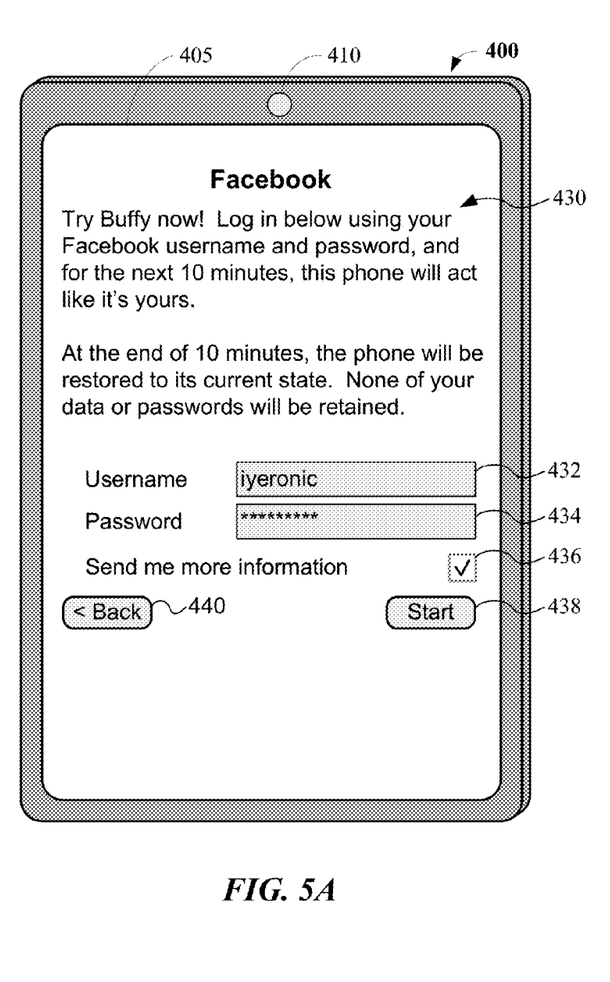
FIGS. 5A-B illustrate example wireframes in which a temporary user logs in to a personal computing device.
Figure 5B:
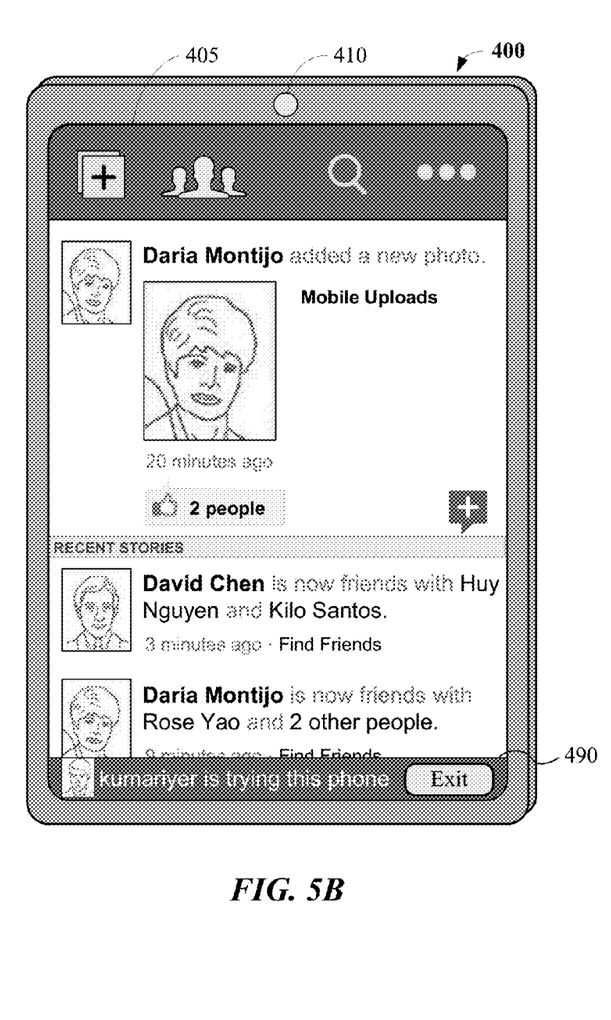

FIGS. 5A-B illustrate example wireframes in which a temporary user logs in to a personal computing device. FIG. 5A illustrates an example user interface that appears on personal computing device 400 once an invitation has been sent. In particular embodiments, a message 435 displayed on personal computing device 400 invites the temporary user to enter their authorization information (e.g., a login interface for a username 442 and password 444). In particular embodiments, the temporary user can indicate (e.g., by marking a checkbox 436) that they would like to receive additional information regarding the trial software and/or hardware. In particular embodiments, when the temporary user clicks the "Start" button 438 to log in, personal computing device 400 enables shared mode. In particular embodiments, the temporary user can also cancel initiation of shared mode by clicking a button 440 to go back to the previous screen or cancel the action.

FIG. 5B illustrates an example user interface that appears on the personal computing device 400 once the temporary user has logged in. In particular embodiments, personal computing device 400 loads the temporary user's personal information upon successful login, so that the example user interface shown in FIG. 5B is personalized for the temporary user. In particular embodiments, personal computing device 400 adopts a personalized interface that is customized to provide the temporary user with a complete experience (as if personal computing device 400 belonged to the temporary user). In particular embodiments, any personal information of a primary user of personal computing device 400 is securely hidden, deleted, or disabled prior to enabling shared mode.

Aspects of personalization may include (1) pre-configured device settings (e.g., background color, background images, ringtones, notification modes, time zone, time/date format, arrangement/format/font/size of icons and text, power conservation settings), (2) pre-loaded and pre-configured applications (e.g., the selection of applications that are installed, pre-authentication for applications that access remote data, application configuration settings, dashboard/desktop configuration, browser bookmarks, calendar items, phone contact list, social network contacts, personal status/ messaging/email history, notifications and alarms, geolocation-related information and saved locations), and (3) pre-loaded content (e.g., music, pictures, videos, e-books, game-related content, documents, other data).

In particular embodiments, shared mode is intended to be temporary—lasting only until the device receives an indication that shared mode is to be terminated (see below for further description of different types of such indications). In the example wireframe illustrated in FIG. 5B, a shared mode status bar 450 is displayed in order to allow the temporary user to explicitly terminate shared mode. In particular embodiments, any personal information of a temporary user of personal computing device 400 is securely deleted or otherwise removed or made inaccessible upon termination of shared mode.

Figure 6:
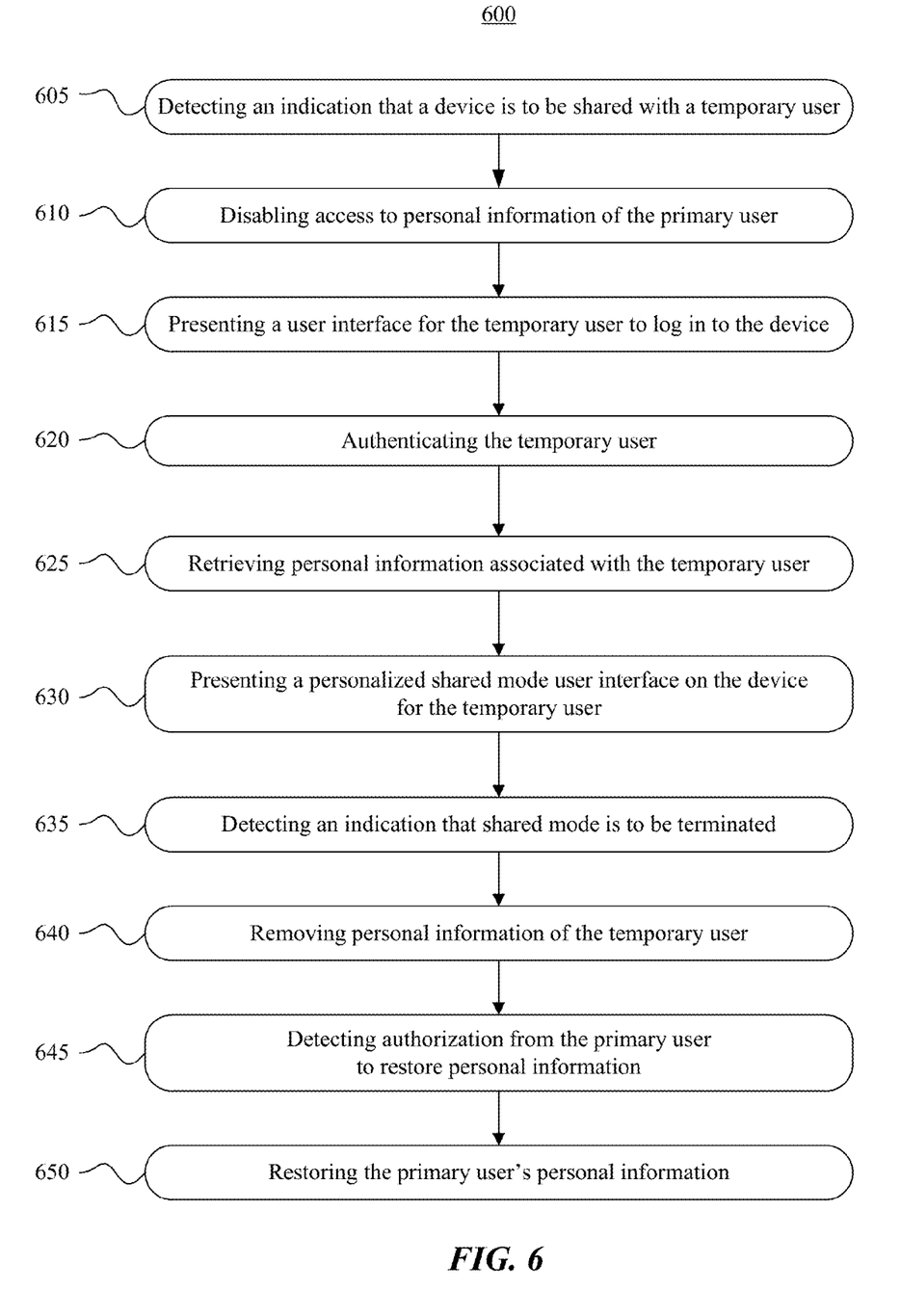
FIG. 6 illustrates a process flow of an example embodiment for enabling an identified temporary user to utilize a personal computing device.

FIG. 6 illustrates a process flow of an example embodiment for sharing a personal computing device with a temporary user. In step 605, the device detects an indication that the device is to be shared with a temporary user. In particular embodiments, step 605 may comprise detecting an affirmative action, such as the primary user clicking on a button, as shown in the examples illustrated in FIGS. 4A-D, or, for example, a voice command, a particular shaking motion detectable by an accelerometer, a particular gesture detectable on a touchscreen, removal of the user's fingertips or palm from an area of the device intended to provide constant biometric identification, or a signal from a remote control device.

In particular embodiments, step 610 may comprise disabling access to personal information associated with the primary user. In particular embodiments, access to data stores on the personal computing device (or to portions thereof) is disabled so as to prevent any possible access by the temporary user to personal information of the primary user. In particular embodiments, caches storing application data, profile information, or other personal information are flushed. In particular embodiments, the device is configured to switch over to use alternate data stores and/or caches and/or disk partitions. In particular embodiments, personal information stored remotely is disabled by disabling or deleting any of the following: cookies, authorization tokens, security certificates, saved usernames and passwords, other user profile information, or any combination thereof.

In particular embodiments, step 615 may comprise presenting an authentication and/or authorization interface (e.g., login interface), one example of which is described herein with respect to FIG. 5A. Any conventional method of authentication and/or authorization suitable for embodiments described herein may be utilized to authenticate the temporary user (step 620).

In particular embodiments, personal information associated with the temporary user is retrieved (step 625) in order to prepare the device for use by the temporary user (e.g., by pre-loading the temporary user's personal information, applications, and content onto the device). In particular embodiments, personal computing device 400 then displays a personalized user interface for the temporary user (step 630), as described above with respect to FIG. 5B.

In particular embodiments, step 635 may comprise detecting an affirmative action by the temporary user indicating that shared mode is to be terminated, such as a button click, a gesture on a touchscreen, a voice command, a particular shaking motion detectable by an accelerometer, or a signal from a remote control device. In particular embodiments, step 635 may comprise detecting a passive action by the temporary user that warrants termination of shared mode, such as removal of the user's fingertips or palm from an area of the device intended to provide constant biometric identification, putting the device down or putting the device away such that a camera of the device is no longer able to perform facial recognition or a scanner of the device is no longer able to scan the temporary user's iris or retina. In particular embodiments, step 635 may comprise detecting an event that warrants termination of shared mode, such as an incoming phone call or text message, a timeout (e.g., after 10 minutes of usage, or after 30 seconds of lack of activity or input—idle), a power cycle or device reset, or a forbidden action by the temporary user, such as an attempt to hack into protected or disabled data stores.

In particular embodiments, upon detecting an indication that shared mode is to be terminated (step 635), personal information of the temporary user is automatically removed or deletect (step 640), and personal information of any primary user of the device is automatically restored (step 650) so that the primary user can begin using their device 400 again. In particular embodiments, where there is no primary user (e.g., with respect to the demo model at the retail store example described above), after step 640, the device reverts back to its default state of displaying a looped video. In particular embodiments, step 635 may further comprise displaying a "locked screen" or login screen so as to require the primary user to log back in or perform some other affirmative action to regain access to the device (step 645), at which point the primary user's personal information or access thereto is restored on the device (step 650). In particular embodiments, the primary user's personal information or access thereto is restored by switching back to using the original data stores and/or caches and/or disk partitions.

In particular embodiments, step 605 may comprise detecting a passive action—that is, when the device detects that a user other than the primary user is attempting to use or view the device, for example, by means of biometric identification techniques. For example, if a primary user puts their device down on a table, and another user picks up the device without the primary user's knowledge, the device may detect the motion of the user picking up the device (e.g., using embedded touch sensors, an accelerometer, and/or a gyroscope), perform biometric identification on the user (e.g., using a camera to perform facial recognition, using a scanner to scan the user's iris, retina, fingerprints, and/or palm veins, and/or using chemical or olfactory sensors), determine that the user is not the primary user, automatically disable access to the primary user's personal information (step 610), and display an interface for authentication and/or authorization (step 615).

As one of skill in the relevant field of art would be aware, it is certainly within the scope of this disclosure to personalize personal computing device 400 for the temporary user to a lesser degree.

Figure 7:
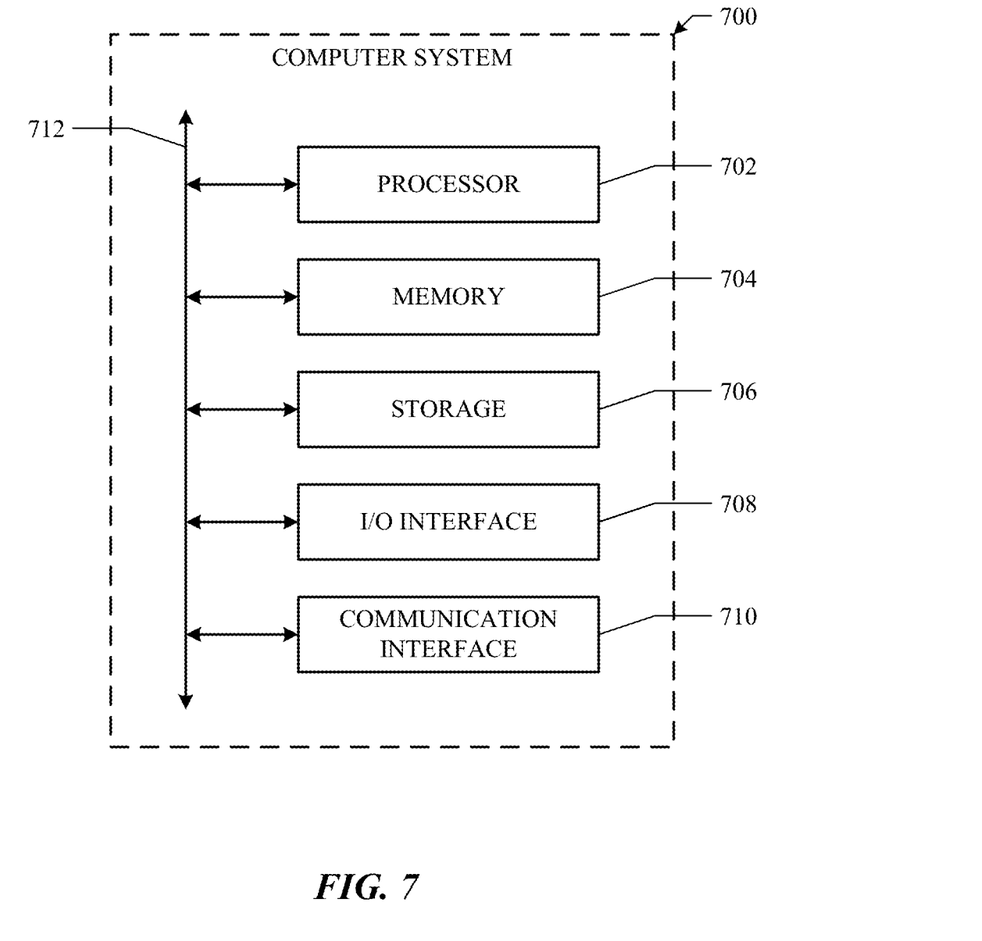
FIG. 7 illustrates an example computer system for performing particular embodiments.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple datacenters; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 02 to memory 704. Bus 712 may include one or more memory buses, as described below. In particular embodiments, one or more memory management units (MMUs) reside between processor 702 and memory 704 and facilitate accesses to memory 704 requested by processor 702. Although this disclosure describes and illustrates particular memory, this disclosure contemplates any suitable memory.

In particular embodiments, storage 706 includes mass storage for data or instructions. Storage 706 may include removable or non-removable (i.e., fixed) media, where appropriate. Storage 706 may be internal or external to computer system 700, where appropriate. In particular embodiments, storage 706 is non-volatile, solid-state memory. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 710 for it. Although this disclosure describes and illustrates a particular communication interface, this disclosure contemplates any suitable communication interface.

In particular embodiments, bus 712 includes hardware, software, or both coupling components of computer system 700 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a social network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising, by one or more first computing devices:
   pre-loading personal information associated with a temporary user to a second computing device to be used by the temporary user, wherein:
      one or more of the first computing devices have access to the personal information in a user account of the temporary user; and
      the personal information is pre-loaded to the second computing device after an invitation to use the second computing device is sent by one or more of the first computing devices to the temporary user;
   receiving an input from the temporary user in response to the invitation, wherein the input comprises log-in information associated with the user account of the temporary user; and
   causing to be provided a personalized interface on the second computing device based at least in part on the personal information associated with the temporary user pre-loaded to the second computing device.

2. The method of claim 1, wherein the second computing device is identified in the invitation sent to the temporary user.

3. The method of claim 1, wherein the invitation comprises a secure authorization code.

4. The method of claim 1, further comprising causing to be displayed on the second computing device in response to the invitation being sent an interface inviting the temporary user to enter the log-in information.

5. The method of claim 1, wherein:
   the second computing device comprises a personal computing device of a primary user other than the temporary user; and
   the method further comprises one or more of hiding, deleting, or disabling access on the second computing device to personal information of the primary user.

6. The method of claim 1, further comprising terminating the personalized interface in response to:
   receiving an indication to terminate the personalized user interface; or
   detecting an event that warrants termination of the personalized user interface.

7. The method of claim 6, further comprising removing or deleting the personal information associated with the temporary user from the second computing device after terminating the personalized interface.

8. One or more computer-readable non-transitory storage media comprising software that is operable when executed by one or more first computing devices to:
   pre-load personal information associated with a temporary user from one or more of the first computing devices to a second computing device to be used by the temporary user, wherein:
      one or more of the first computing devices have access to the personal information in a user account of the temporary user; and
      the personal information is pre-loaded to the second computing device after an invitation to use the second computing device is sent by one or more of the first computing devices to the temporary user;
   receive an input from the temporary user in response to the invitation, wherein the input comprises log-in information associated with the user account of the temporary user; and
   cause to be provided a personalized interface on the second computing device based at least in part on the personal information associated with the temporary user pre-loaded to the second computing device.

9. The media of claim 8, wherein the invitation comprises a secure authorization code.

10. The media of claim 8, wherein the software is further operable when executed to cause to be displayed on the second computing device in response to the invitation being sent an interface inviting the temporary user to enter the log-in information.

11. The media of claim 8, wherein:
   the second computing device comprises a personal computing device of a primary user other than the temporary user; and
   the software is further operable when executed to hide, delete, or disable access on the second computing device to personal information of the primary user.

12. The media of claim 8, wherein the software is further operable when executed to terminate the personalized interface in response to:
   receiving an indication to terminate the personalized user interface; or
   detecting an event that warrants termination of the personalized user interface.

13. A first computing device comprising:
   one or more processors; and
   one or more memory devices coupled to the processors comprising instructions executable by the processors and operable when executed by the processors to:
      pre-load personal information associated with a temporary user from the first computing device to a second computing device to be used by the temporary user, wherein:
         the first computing device has access to the personal information in a user account of the temporary user; and
         the personal information is pre-loaded to the second computing device after an invitation to use the second computing device is sent by the first computing device to the temporary user;
      receive an input from the potential temporary user in response to the invitation, wherein the input comprises log-in information associated with the user account of the temporary user; and
      cause to be provided a personalized interface on the second computing device based at least in part on the personal information associated with the temporary user pre-loaded to the second computing device.

14. The first computing device of claim 13, wherein the invitation comprises a secure authorization code.

15. The first computing device of claim 13, wherein the software is further operable when executed by the processors to cause to be displayed on the second computing device in response to the invitation being sent an interface inviting the temporary user to enter the log-in information.

16. The first computing device of claim 13, wherein:
the second computing device is a personal computing device of a primary user other than the temporary user; and
the software is further operable when executed by the processors to hide, delete, or disable access on the second computing device to personal information of the primary user.

17. The first computing device of claim 13, wherein the software is further operable when executed by the processors to terminate the personalized interface in response to:
receiving an indication to terminate the personalized user interface; or
detecting an event that warrants termination of the personalized user interface.

* * * * *